United States Patent [19]
Macklin et al.

[11] 4,441,189
[45] Apr. 3, 1984

[54] FOIL ELECTRODE SPER LIGHT SOURCE

[75] Inventors: John J. Macklin, Highlands; William T. Silfvast, Holmdel, both of N.J.; Obert R. Wood, II, New York, N.Y.

[73] Assignee: Bell Telephone Laboratories, Incorporated, Murray Hill, N.J.

[21] Appl. No.: 367,216

[22] Filed: Apr. 9, 1982

[51] Int. Cl.³ ............................................. H01S 3/097
[52] U.S. Cl. ....................................... 372/76; 372/56; 372/87
[58] Field of Search .................... 372/76, 87, 56, 62

[56] References Cited

U.S. PATENT DOCUMENTS 4,336,506  6/1982  Silfvast et al. .................... 372/76

Primary Examiner—James W. Davie
Attorney, Agent, or Firm—Michael J. Urbano

[57] ABSTRACT

Numerous laser transitions in the visible and near-infrared in four metal vapors (Li, Al, Ca, and Cu) have been observed in the recombination phase of the expanding plasmas produced by a segmented plasma device employing foil electrodes. Also described is a segmented vapor plasma discharge in using Ni foil electrodes.

12 Claims, 5 Drawing Figures

FOIL ELECTRODE SPER LIGHT SOURCE

BACKGROUND OF THE INVENTION

This invention relates to plasma excitation recombination light sources such as lasers.

In Applied Physics Letters, Vol. 36, No. 8, p. 615 (1980), W. T. Silfvast, L. H. Szeto and O. R. Wood, II, describe a new electric discharge device developed for producing laser action in the atomic spectra of a number of metal vapors by a segmented plasma excitation and recombination (SPER) mechanism. This laser includes a number of narrow metal strips (of the lasing species) positioned end-to-end on an insulating substrate in such a way as to leave a small gap between each pair of adjacent strips. The strips are positioned in a laser cavity containing either a buffer gas (preferably) or a vacuum and typically are 1 mm thick, 2 mm wide, and 10 mm long (hereinafter "bulk electrodes"). When a high-voltage, high-current pulse is applied to the end strips of this arrangement, a high-density metal-vapor ion plasma is formed in each gap. Once formed, these plasmas (consisting primarily of vaporized strip material) expand essentially hemispherically, cool in the presence of the background gas (e.g., helium) at low pressure and recombine. Using this laser configuration, laser action was observed in the near infrared at more than seventy wavelengths between 0.29 and 3.95 μm in 11 elements (Ag, Bi, C, Ca, Cd, Cu, In, Mg, Pb, Sn, Zn), 3 of which (Mg, Zn, In) had not been observed to oscillate in their neutral spectrum before. Some of these results are reported in the aforementioned APL article; others are reported by W. T. Silfvast et al in Applied Physics Letters, Vol. 39, No. 3, p. 212 (1981) and in Optics Letters Vol. 7, No. 1, p. 34 (1982).

The SPER laser is simple to construct, can be easily scaled in length and volume, has been shown to be capable of long life, and has the potential for high efficiency. It is the subject matter of copending application Ser. No. 82,308 filed on Oct. 5, 1979, now U.S. Pat. No. 4,336,506 issued on June 22, 1982, and copending application Ser. No. 367,092 filed on Apr. 9, 1982, now U.S. Pat. No. 4,395,770 issued on July 26, 1983, both of which are assigned to the assignee hereof.

Lasing action in a SPER laser is not observed with equal facility with all metals, even at high pressure of the background gas. A figure of merit, M, can be derived which defines the relative ease of achieving lasing action in a metal vapor. M is defined as follows:

$$M = 1/KcpT^2 \qquad (1)$$

where k is the thermal conductivity of the metal, c is the specific heat of the metal, p is the density of the metal, and T is the absolute temperature of the surface of the metal electrode. This expression is derived from a heat equation for the time necessary to raise the electrode surface temperature to a value T by ion or electron current entering the electrode surface. For the value of the temperature at which the vapor pressure of the metal is approximately 0.1 Torr, a list of a number of metals together with calculated values of M normalized to the value for Cd metal, is given in the following table:

| METAL | M |
|---|---|
| Cd | 1.00 |
| Na | .99 |
| Pb | .57 |
| In | .41 |
| Zn | .39 |
| Li | .33 |
| Ca | .27 |
| Sn | .11 |
| Ni | .03 |
| Al | .02 |
| Cu | .01 |

For the alkali metals (Na, Li, Ca) M should be calculated for the oxides that form for these metals. Experimentally, metals with M~1 have been found to easily produce segmented metal vapor plasmas necessary for lasing action in SPER lasers at low background gas pressures (e.g., 1-10 Torr), whereas metals with M<<1, such as Li, Al, Ca, and Cu, do not even produce segmented plasmas. With these metals, as the background gas pressure is reduced, the discharge current is carried by a discharge in the background gas between non-adjacent electrodes, effectively shorting out the intervening metal-vapor arcs, reducing the number of metal vapor plasmas and, hence, lowering the net gain.

SUMMARY OF THE INVENTION

We have found that segmented metal vapor plasma discharges and lasing action in SPER devices can be achieved, even at relatively low background gas pressures, with metal electrodes of materials having M<<1 provided that the metal strips constitute foil electrodes which are sufficiently thinner (typically about 10 times thinner) than the prior art bulk electrodes so that discharges occur only between adjacent electrodes, thereby eliminating the short circuiting problem associated with bulk electrodes. Using this foil electrode SPER configuration, we have achieved laser action in four metals (Li, Al, Ca, and Cu) in which laser oscillation was not possible using bulk electrodes and low pressures. As a result, we observed recombination laser action on 30 transitions with oscillating wavelengths ranging from 569.6 nm to 5460 nm. Twenty-eight of these transitions have not previously been made to undergo laser oscillation by any excitation means. In addition, we observed segmented vapor plasma discharges in a SPER with Ni foil electrodes.

BRIEF DESCRIPTION OF THE DRAWING

Our invention, together with its various features and advantages, can be readily understood from the following, more detailed description taken in conjunction with the accompanying drawing, in which.

DETAILED DESCRIPTION

Figure 1:
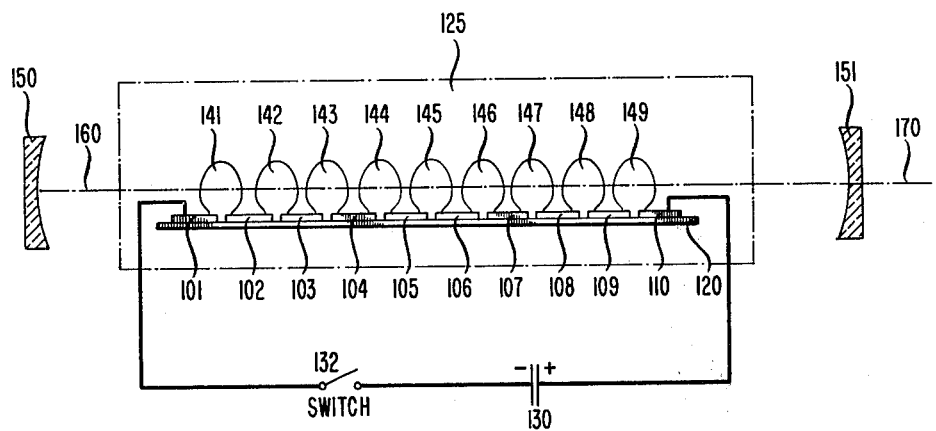
FIG. 1 is a schematic of a SPER laser in accordance with an illustrative embodiment of our invention.

An embodiment of the present invention used for the production of a segmented plasma-excitation and recombination (SPER) laser in a metal vapor is shown in FIG. 1. A plurality of metal strips 101-110, each constituting a foil electrode, are positioned end-to-end on an electrically insulating plate 120 in such a manner as to leave a small gap between each pair of adjacent strips. This electrode arrangement is then installed in a gas cell 125. A capacitor 130 and a switch 132 are connected in series across the first (101) and last (110) electrodes. The capacitor 130 is charged to a few tens of kilovolts and is then discharged across the series of metal strips with a spark gap. Operation at much lower voltages (e.g., a few tens of volts) is also possible, however. The resulting current pulse produces a bright metal vapor plasma in each gap. Areas 141-149 in FIG. 1 depict the shape of the plasmas after they have expanded essentially hemispherically outward from the gaps into a background gas.

Figure 5:
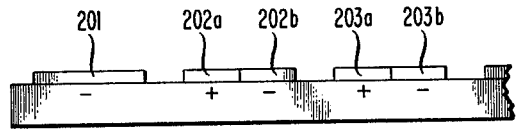
FIG. 5 is a schematic of an alternative embodiment of our invention utilizing bi-metallic strips.

The entirety of each strip need not constitute a material which is vaporizable into a plasma. As shown in FIG. 5, it is sufficient if the cathode ends (202b, 203b, etc.) constitute such a material and that the anode ends (202a, 203a, etc.) constitute a non-vaporizable material under the operating condition of the device. In this embodiment, for example, each strip would comprise tandem segments (e.g., 202a and 202b) of non-vaporizable and vaporizable material electrically connected to one another. Within the scope of applications intended here, an example of a non-vaporizable material is tungsten.

Moreover, strips of different vaporizable materials can be mixed within a single device so as to yield a multi-color source.

Two dielectric spherical mirrors 150 and 151 are coated for maximum reflectivity at the desired lasing wavelength to form a resonator for the laser radiation. Illustratively, these mirrors are mounted on the ends of a tube which forms gas cell 125. The optical axis 160 of this resonator is positioned parallel to and slightly above the row of foil electrodes. The output from this resonator, shown as line 170, is focused through suitable filters onto a suitable photodetector (not shown).

Insulating plate 120 is not essential to operation of the laser. In fact, plate 120 can be eliminated without significantly affecting the laser output. It does, however, function as a structural support for the electrodes and can control the direction of plasma expansion to some extent.

In prior work with Cd SPER lasers, capacitor 130 had a capacitance of 0.01 $\mu$F and was charged to 21 kV to produce an 840 A current pulse having a ringing frequency of 1.2 MHz. The background gas was helium at a low pressure of 5 Torr. The mirrors had a 3 m radius of curvature and formed a 12 cm long resonator for the laser radiation with the optical axis positioned 7 mm above the foil electrodes. The photodetector was a room temperature Ge diode.

EXAMPLE

Using an arrangement of the type shown in FIG. 1, we have made SPER lasers in the visible and near infrared at wavelengths between 569.6 nm and 5460 nm in four metal elements having $M < < 1$: Li, Al, Ca and Cu. Table I lists the observed wavelengths and the transition assignments for these elements.

In our experimental arrangement on these SPER lasers we used a background gas of helium at low pressures of 1-10 Torr. Forty-one foil electrodes were arranged in tandem on a glass substrate. The foil electrodes were typically 25 mm long by 2.5 mm wide by 0.1-0.2 mm thick. The gap width between adjacent electrodes was preferably about 0.2 mm for Li and Ca and about 0.5 mm for Al and Cu. Importantly, this thin foil electrode geometry differs from that used in previous experiments where 1.0 mm thick bulk electrodes spaced 1.0 to 2.0 mm apart were used. When this 41-electrode assembly was excited with 15-30 kV pulses from a low inductance transmission line circuit, producing a 5 $\mu$sec current pulse of 50-200 A, a metal vapor plasma was formed in each gap. The 40 metal vapor plasmas (produced about 25 mm apart) expanded 20-25 cm away from the gap regions into the low pressure helium gas (1-10 Torr), and in the afterglow cooled to the point that collisional recombination dominated all other electron loss processes. Collisional de-excitation of the high lying excited states of the recombined ions or atoms populated levels where radiative decay dominated over collisional decay and established population inversions. Laser action was observed in these plasmas when the axis of a 115 cm-long laser resonator was positioned parallel to and 7 mm above the foil electrodes. A resonator formed by two, 2 meter-radius of curvature, highly reflecting dielectric coated mirrors 150 and 151 was used for those lasers with wavelengths less than 1900 nm, and a resonator formed by two, 2 meter-radius of curvature, gold coated mirrors (one mirror was provided with a 2 mm diameter central coupling hole) was used for wavelengths greater than 1900 nm. The laser output was observed through a ¼ meter monochromator and (depending on wavelength) was detected with either a photomultiplier, an intrinsic germanium detector, or a liquid helium cooled Ge:Cu detector.

The 30 new recombination lasers produced using our foil electrode SPER configuration are listed in Table I. Since recombination of the stages of ionization always occurs in descending order, the temporal behavior of the laser output aided in the identification of the particular neutral or ion stage involved in laser action. Assignments within a particular stage also were not difficult since recombination lasers generally occur across energy gaps in the spectrum of each ionization stage.

Figure 2:
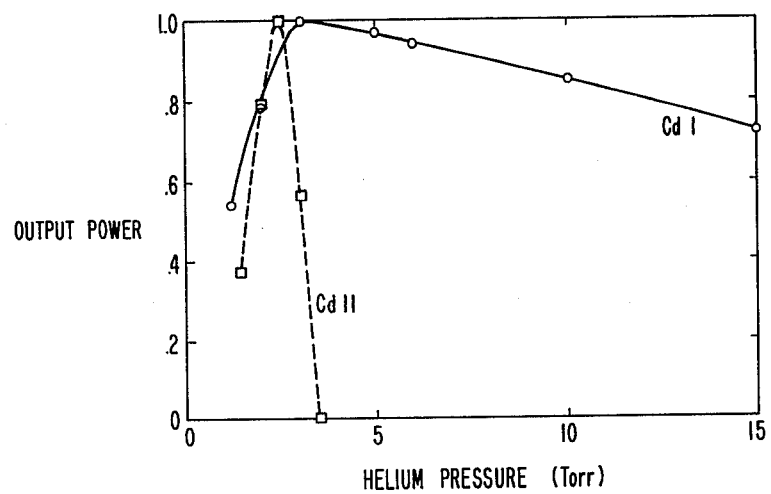
FIG. 2 is a graph of relative output power as a function of helium pressure for a Cd SPER laser operating on the 1.433 μm transition in Cd I and the 537.8 nm transition in CD II.

In order to obtain recombination laser action, particularly in higher ion stages, the plasmas should be segmented as in FIG. 1 to maximize cooling, and the plasmas should be produced in a background gas (e.g., helium) at low pressure where, as FIG. 2 indicates, the gain will be highest.

The technique of enhancing gain through plasma segmentation has been discussed in the Silfvast et al articles and patent application, supra, where it was shown that in a properly operating SPER laser, gas breakdown is followed by the formation of a metal vapor arc in each gap. As mentioned earlier, however, with metals having a low figure of merit M, as the helium pressure is reduced, the discharge current is carried by a discharge in the helium gas between non-adjacent electrodes, effectively shorting out the intervening metal vapor arcs, reducing the number of metal vapor plasmas and, hence, lowering the net laser gain. The path which the arc discharge ultimately takes depends on formative time lags and the rate of growth of ionization along each path since the applied voltage exceeds that necessary for breakdown not only for the gaps but also along paths in the buffer gas between non-adjacent bulk electrodes as well. Ionization growth between non-adjacent bulk electrodes is dominated by ionization phenomena in the background gas and is expected to be roughly constant for different metals and electrode geometries. On the other hand, techniques that enhance the metal vapor production in the gap regions should lead to increased ionization growth and further vapor production and, hence, are expected to be determined to some extent by the properties of the particular metal used as the electrodes.

The background gas is believed to serve two purposes in the plasma expansion process: (1) to cool the electrons thereby inducing electron-ion recombination, and (2) to confine the region of inversion to the mode volume of the optical cavity. A typical curve of laser output versus pressure for a SPER-type device in the neutral atom (Cd I) resulting from recombination of the Cd+ ion and in the single ion (Cd II) resulting from recombination of Cd++ is shown in FIG. 2. It can be seen that, especially for higher ion stages, low background gas pressures are important.

Figure 3:
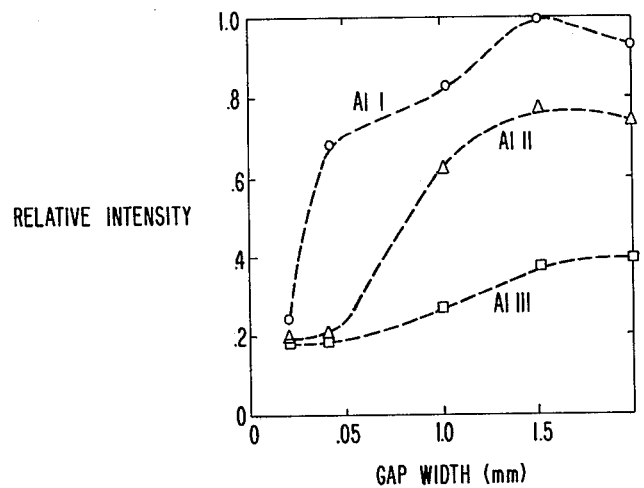
FIG. 3 is a graph of the relative intensity of the spontaneous emission as a function of gap width on the 394.4 nm Al I resonance line, on the 281.6 nm Al II line, and on the 569.6 nm Al III line from a single-gap Al SPER device operating at a helium pressure of 3 Torr.

For recombination laser action the gap width should be chosen to optimize the spontaneous emission intensity from the metal vapor arcs. The dependence of the spontaneous emission intensity of the 394.4 nm Al I resonance line in a foil electrode Al SPER laser on increasing gap width is shown in FIG. 3. The emission intensities of lines in the Al II and Al III spectra were also found to vary with gap width in roughly the same way. When the gap width was increased beyond 2.0 mm the emission from the metal vapor dropped, and a helium discharge appeared between the metal vapor-dominated spherically-shaped plasmas. The results shown in FIG. 3 demonstrate that the intensity of the spontaneous emission (and, if the electron density is not too high, the gain) increases with gap width and has a maximum in a foil electrode Al SPER device at approximately 1.5 mm.

Figure 4:
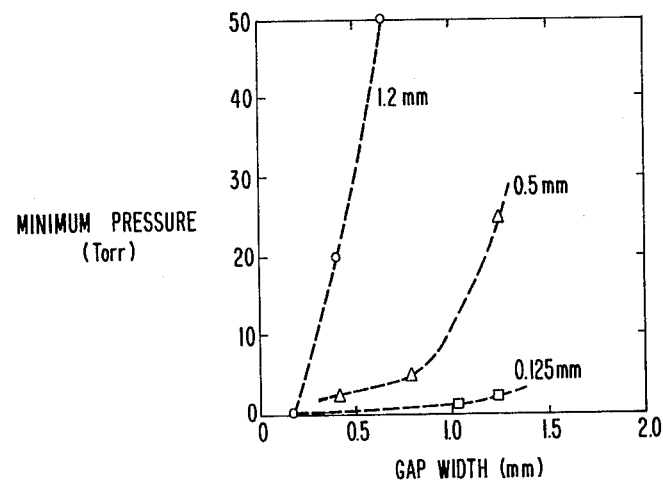
FIG. 4 is a graph of the minimum helium pressure for reliable operation of an 11-gap Al SPER laser as a function of gap width for three values of electrode thickness; namely, 1.2 mm, 0.5 mm, 0.125 mm.

The effects of gap width and foil electrode thickness on the ability of plasmas to form at relatively low pressure were tested in the following way. A number of eleven-gap foil electrode Al-SPER devices (each with a different gap width) were constructed by careful machining to achieve gaps with macroscopic uniformity. As the pressure of the helium background gas was gradually reduced, there was a well-defined pressure at which one or more gaps were shorted out by the occurrence of a helium plasma between non-adjacent electrodes. This pressure, the lowest pressure the device reliably provided segmented plasmas, is denoted $P_{min}$. The results of measurements of $P_{min}$ on a series of devices with different gap widths and foil electrode thicknesses, when excited with a peak current of 200 A and a duration of 5 $\mu$sec, are shown in FIG. 4. In contrast with the strong dependence on foil electrode thickness, little effect was found in varying the width of the foil electrodes. For gap widths greater than 0.1 mm only the thinnest foil electrodes (0.125 mm) resulted in low values for $P_{min}$ and in segmented Al vapor plasmas. Thus, to produce the highest net gain and, hence, to maximize the chances of obtaining recombination laser action in Al, gap widths of approximately 1.0 mm and foil electrode thicknesses of approximately 0.1 mm should be used, although the actual gap width used will be determined by the lowest pressure necessary for laser action.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, it is thought that foil electrodes work well because they enhance the thermal processes that act at the surface of the electrodes by reducing the heat lost due to conduction into the electrode. In the case of bulk electrodes the heat flow into the electrode is three dimensional, but in a foil geometry the heat flow is more nearly two dimensional. Hence, heat loss due to conduction is less for foils, and the surface of the foil electrode reaches a given temperature in a shorter period of time. This effect is thought to lead to higher vapor pressures and enhanced ionization growth rates.

Regardless of the mechanism, however, foil electrodes not only permit the use of metals with a low figure of merit in segmented plasma devices at low pressures, but also permit the generation of plasmas in reactive metals (e.g., alkali metals) which have oxide layers on their surfaces.

In addition, our foil electrode SPER device has enabled us to observe spontaneous emission in Ni (M=0.03) at wavelengths characteristic of its visible emission.

TABLE I

| Metal | Wavelength ($\mu$m) | Transition Assignment |
|---|---|---|
| Li I | 1.279 | $5f\ ^2F° - 3d\ ^2D$ |
|  | 1.870 | $5d\ ^2D_{5/2} - 4f\ ^2F°_{5/2}$ |
|  | 2.689 | $3d\ ^2P°_{3/2} - 3s\ ^2S_{\frac{1}{2}}$ |
|  | 4.057 | $4f\ ^2F°_{7/2} - 3d\ ^2D_{5/2}$ |
| Al I | 1.126 | $4f\ ^2F°_{7/2} - 3d\ ^2D_{5/2}$ |
|  | 3.863 | $5p\ ^2P°_{3/2} - 5s\ ^2S_{\frac{1}{2}}$ |
| Al II | 0.7042 | $4p\ ^3P°_2 - 4s\ ^3S_1$ |
|  | 0.7471 | $4f\ ^1F_2 - 3d\ ^1D_3$ |
|  | 0.7515 | (unknown) |
|  | 1.008 | $4p\ ^3P°_2 - 3d\ ^3D_1$ |
|  | 1.012 | $4p\ ^3P°_0 - 3d\ ^3D_1$ |
|  | 1.246 | $5d\ ^1D_2 - 5p\ ^1P°_1$ |
|  | 1.406 | $7p\ ^1P°_1 - 6s\ ^1S_0$ |
| Al III | 0.5696 | $4p\ ^1P°_{3/2} - 4s\ ^2S_{\frac{1}{2}}$ |
|  | 0.5722 | $4p\ ^2P°_{\frac{1}{2}} - 4s\ ^2S_{\frac{1}{2}}$ |
| Ca I | 1.304 | $3d\ ^2F_3 - 4p'\ ^3F°_3$ |
|  | 1.317 | $3d\ ^3F_3 - 4p'\ ^3F°_4$ |
|  | 1.425 | $5d\ ^3D_3 - 4p'\ ^3F°_2$ |
|  | 1.897 | $3d^2\ ^3F_3 - 4p'\ ^3D°_2$ |
|  | 1.905 | $3d^2\ ^3F_4 - 4p'\ ^3D°_3$ |
| Ca II | 1.184 | $5p\ ^2P°_{\frac{1}{2}} - 5s\ ^2S_{\frac{1}{2}}$ |
|  | 1.195 | $5p\ ^2P°_{3/2} - 5s\ ^2S_{\frac{1}{2}}$ |
| Cu I | 1.257 | $5f\ ^2F°_{7/2} - 4d\ ^2D_{5/2}$ |
|  | 1.815 | $4f\ ^2F°_{5/2} - 4d\ ^2D_{3/2}$ |
|  | 1.818 | $4f\ ^2F°_{7/2} - 4d\ ^2D_{5/2}$ |
|  | 3.089 | (unknown) |
|  | 3.726 | $4p'\ ^2P°_{\frac{1}{2}} - 5s\ ^2S_{\frac{1}{2}}$ |
|  | 5.460 | $7d\ ^2D_{3/2} - 7p\ ^2P°_{\frac{1}{2}}$ |
| Cu II | 0.7807 | $6s\ ^3D_3 - 5p\ ^3F°_4$ |
|  | 1.787 | (unknown) |

What is claimed is:
1. In a recombination light source, apparatus comprising:

excitation means (130) for producing radiation;

said excitation means comprising at least two strips (101–110) having at least one gap, which at least one gap provides at least one intervening discharge path; and means for applying an electrical pulse to said at least two strips;

at least a portion of said at least two strips being fabricated from a material which is converted into a plasma as a result of the application of said electrical pulse, which plasma cools and recombines to generate said radiation; characterized in that said portions comprise a material having a figure of merit M much less than unity and are sufficiently thin so that said discharge path occurs only between adjacent ones of said at least two strips.

2. The apparatus of claim 1 wherein said material has a figure of merit $M < 0.33$.

3. The apparatus of claim 2 wherein said material is a metal selected from the group consisting of Li, Al, Ca, Ni, and Cu.

4. The apparatus of claim 1 wherein said at least two strips are each approximately 0.1–0.2 mm thick.

5. The apparatus of claim 1 further including a gas cell containing helium at a pressure of about 1–10 Torr, said at least two strips being positioned within said gas cell.

6. The apparatus of claim 1 wherein said at least one gap has a width of approximately 0.2–0.5 mm.

7. The apparatus of claim 1 wherein the entirety of each of said at least two strips comprise said material.

8. The apparatus of claims 1, 2, 4, 5, 6 or 7 for use as a laser and further including a resonant laser cavity which permits egress of said radiation therefrom, said excitation means producing said radiation in said cavity.

9. The apparatus of claim 8 wherein said material is selected from the group consisting of Li, Al, Ca, and Cu.

10. A recombination laser comprising:

a resonant laser cavity (150, 151) which permits egress of lasing radiation therefrom, excitation means (130) for producing said lasing radiation in said resonant laser cavity;

said excitation means comprising at least two conductor strips (101–110) having at least one gap, which at least one gap provides at least one intervening discharge path; and means for applying an electrical, pulse to said at least two conductor strips; and a cell for containing a background gas and in which said at least two strips are located;

at least a portion of said at least two conductor strips being fabricated from a material which is converted into a plasma as a result of the application of said electrical pulse, which plasma cools and recombines to generate said lasing radiation; characterized in that said material has a figure of merit $M \lesssim 0.33$, said at least two strips each have a thickness of about 0.1–0.2 mm, said at least one gap has a width of about 1.0 mm or less, and said background gas comprises helium at a pressure of about 1–10 Torr.

11. The laser of claim 10 wherein said material is selected from the group consisting of Li, Al, Ca, and Cu.

12. The laser of claims 10 or 11 wherein the entirety of each of said at least two strips comprises said material.

* * * * *

UNITED STATES PATENT AND TRADEMARK OFFICE
CERTIFICATE OF CORRECTION

PATENT NO. : 4,441,189

DATED : April 3, 1984

INVENTOR(S) : John J. Macklin, William T. Silfvast, and Obert R. Wood, II

It is certified that error appears in the above-identified patent and that said Letters Patent is hereby corrected as shown below:

Column 1, line 57, "p" should read $--\rho--$.
In claim 2, column 7, line 18, "<" should read $--\leq--$.

Signed and Sealed this

Sixteenth Day of April 1985

[SEAL]

Attest:

DONALD J. QUIGG

Attesting Officer  Acting Commissioner of Patents and Trademarks